United States Patent [19]

Pomerantz et al.

[11] 4,165,641

[45] Aug. 28, 1979

[54] LIQUID LEVEL SENSING MEANS

[75] Inventors: Daniel I. Pomerantz, Lexington; Michael Smolin, Brookline, both of Mass.

[73] Assignee: P. R. Mallory & Co. Inc., Indianapolis, Ind.

[21] Appl. No.: 624,919

[22] Filed: Oct. 22, 1975

Related U.S. Application Data

[63] Continuation-in-part of Ser. No. 480,052, Jun. 17, 1974, abandoned.

[51] Int. Cl.² ............................................. G01F 23/28
[52] U.S. Cl. ................................ 73/290 R; 73/304 C
[58] Field of Search .................... 73/290 R, 304 R; 331/65, 109; 137/392; 340/244 R

[56] References Cited

U.S. PATENT DOCUMENTS

| | | | |
|---|---|---|---|
| 1,780,952 | 11/1930 | Symmes | 340/244 R |
| 2,354,964 | 8/1944 | Ostermann et al. | 73/304 C |
| 3,319,184 | 5/1967 | McCall | 331/109 |
| 3,326,043 | 6/1967 | Roeske et al. | 73/290 R |
| 3,375,467 | 3/1968 | Weinrich | 331/109 X |
| 3,511,580 | 5/1970 | Eckhardt et al. | 137/392 X |
| 3,641,544 | 2/1972 | Radin | 73/304 R X |

Primary Examiner—S. Clement Swisher
Attorney, Agent, or Firm—Hoffmann, Meyer & Coles

[57] ABSTRACT

An inductance element, such as a coil, cooperates with a detector/amplifier circuit to detect the level of a liquid in a container by quenching oscillations in an electrical circuit when the liquid is brought into close proximity to the inductance element.

1 Claim, 4 Drawing Figures

LIQUID LEVEL SENSING MEANS

This is a Continuation-in-Part of Application Ser. No. 480,052 filed June 17, 1974 now abandoned.

Generally speaking, the present invention relates to liquid level sensing devices detecting the presence of a mobile material, and more particularly to a sensing means and method for sensing a level of a liquid, comprising an inductance means for producing an inductive field, a supply means for providing a liquid in close proximity to the inductance means, and a detector/amplifier circuit connected to the inductance means to provide an oscillator circuit and a signal in response to a quenching of oscillations in the inductance means.

In many applications, it is desirous to detect the level of a liquid in a container. In response to the presence of a liquid level an electrical signal may be produced to activate any number of devices including alarms and controllers to govern the flow of a liquid to a container. One example of a liquid level detector is used in a washing machine to turn a water supply valve off when the level reaches a predetermined position. Liquid level detectors are available that generally include circuits producing oscillatory signals. The presence of a liquid in close proximity to a sensor causes a detectable change in amplitude or frequency of the oscillatory signal. The nature of many of these circuits is such that only liquids of high electrical conductivity, such as mercury, can be detected. Unlike these circuits, the present invention functions successfully with liquids of an electrical resistivity of from 0 to 20 megohm-centimeters. For example water having resistivity up to 1 or 2 megohm-centimeters, as well as liquid metals having resistivities of the order of $10^{-4}$ ohm-centimeters can be sensed. The detection of the cessation of oscillation appears as a change in an electrical signal appearing across two terminals. As was mentioned previously, this signal change can be used to activate any number of devices.

Of the known detector circuits which utilize a quenching of oscillations in a circuit in response to the presence of a liquid, the sensor is disposed in electrical contact with the liquid. Such a circuit, however, is undesirable in certain applications, for example in washing machines. More specifically, with the sensor in electrical contact with the liquid, the operator of the machine is subject to severe electrical shock. And further with the sensor in the liquid of a washing machine, the sensor is subject to severe corrosion problems.

In addition known detector circuits which utilize a quenching of oscillations do not have a means to adjust the sensitivity of the circuit such that the oscillations are readily quenched.

Accordingly, it is a feature of the present invention to provide a sensing means for sensing the level of a liquid. Another feature of the present invention is to provide a sensing means for sensing the level of a liquid, that includes an inductance means for producing an inductive field. Another feature of the present invention is to provide a sensing means for sensing the level of a liquid, including a supply means for providing a liquid in close proximity to an inductance means. Yet another feature of the present invention is to provide a sensing means for sensing the level of a liquid, that includes a detector/amplifier circuit connected to an inductance means to provide an oscillator circuit and an electrical signal in response to a quenching of oscillations when liquid is brought into close proximity to the inductance means. Yet another feature of the invention is to provide such a sensing means wherein the sensitivity of the oscillator circuit is adjusted to more readily assure a quenching of oscillations. Still another feature of the present invention is to provide a sensing means for sensing the level of a liquid, including electrical insulation to isolate an inductance means from a liquid. Another feature of the present invention is to provide a sensing means for sensing the level of a liquid, including a plurality of coils wound around a hollow tube through which a liquid may rise, each coil being able to select a level of the liquid, and a selector means for selecting any one of the coils to function with a detector/amplifier circuit. Yet another feature of the present invention is to provide a method of sensing a level of a liquid in a container, comprising the steps of producing oscillations in an inductance coil located in spaced relation to the level of the liquid, detecting a suppression of oscillations in the inductance coil in response to the liquid coming into close proximity to the coil, and producing an electrical signal in response to the detected suppression of oscillation.

These and other features will become more apparent from the specification taken in conjunction with the drawings wherein.

Figure 1:
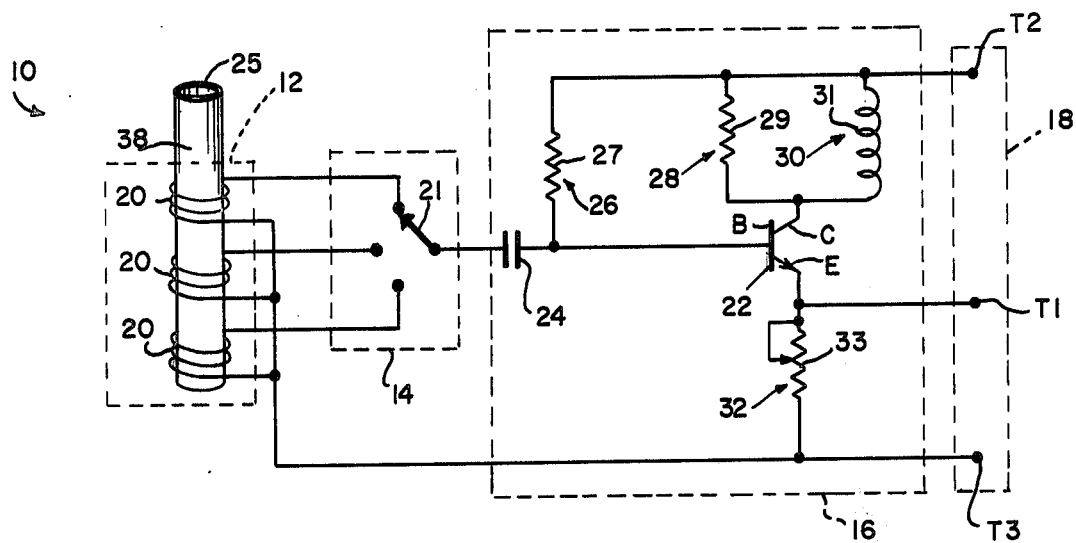
FIG. 1 is a wiring diagram of a liquid level sensing means showing an inductance means wound around a liquid supply means.

One embodiment of a liquid level sensing means 10, illustrated in FIG. 1, generally comprises an inductance means 12, a selector means 14, a detector/amplifier circuit 16, electrical terminals 18, and liquid supply means 25.

Inductance means 12, for establishing an inductive field, may comprise at least one coil 20 or a plurality of coils 20 (FIG. 1 shows three). The number of coils is immaterial to the operation of the circuit because selector means 14 singles out only one coil at a time to be used with detector/amplifier circuit 16. Each of coils 20 is wound on a coil former for holding and shaping the coils.

Figure 2:
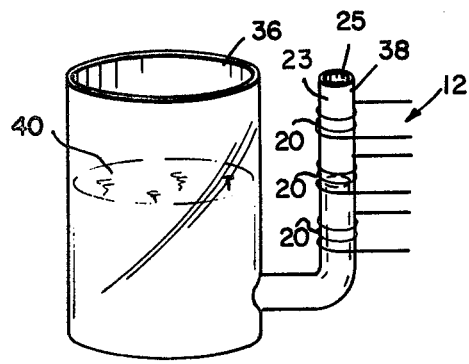
FIGS. 2, 3 and 4 show three different coil formers used with an inductance means.
Figure 3:
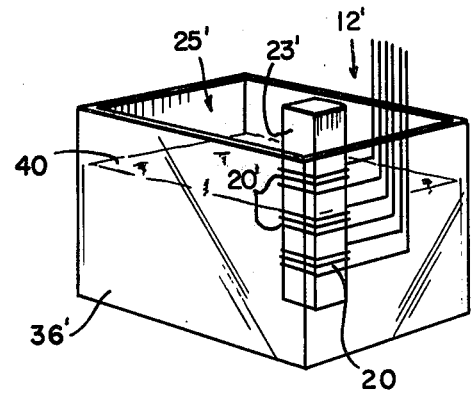
Figure 4:
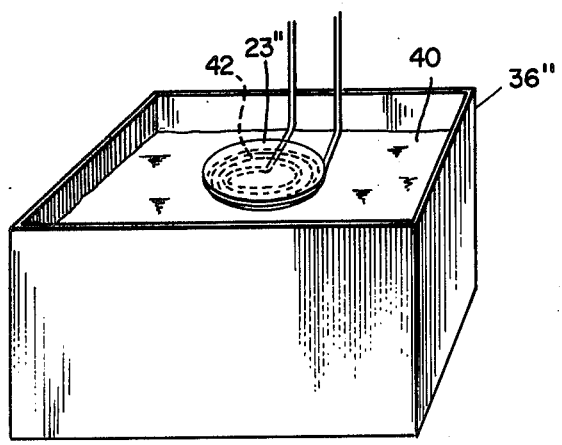

Inductance means 12 is shown with different coil formers in FIGS. 2, 3 and 4. In FIG. 2, a container 36 includes a hollow tube 38. The outside surface of tube 38 in this case also acts as coil former 23. The relative size or cross/sectional shape of tube 38 is immaterial as long as it is connected to container 36, as shown in FIG. 2, so that the level of a liquid 40 is the same in each. In this embodiment coil 20 is wound around the outside of tube 38. The tube may have thin walls and should be constructed of a non-magnetic non-electrically conductive material such as a thermoplastic. The inside of tube 38 acts as liquid supply means 25 for supplying a liquid in close proximity to first inductance means 12.

Another coil former used with an inductance means 12' is shown in FIG. 3. In this case coils 20' are wound around the outside of a solid member coil former 23'. The coils are electrically insulated from liquid 40 by suitable coating so as to be in close proximity therewith. A thin dip-coating of latex, could be used for example. The coilcarrying member 23' is placed in a container 36' and liquid 40 is allowed to rise around it. In this case liquid supply means 25 comprises container 36' which not only holds liquid 40 but also provides it in close proximity to inductance means 12'. Upon reaching the coil selected by selector means 14, the level of liquid 40 is detected by that coil.

Another coil former used with inductance means 12 is illustrated in FIG. 4. A flat spiral coil 42 is carried by one side of a flat coil former 23". As the level of a liquid 40 in a container 36" comes into close proximity to coil 42, but does not come into electrical contact therewith, the level is detected by the coil. Liquid supply means 25 in this embodiment comprises container 36".

Selector means 14, for selecting a coil 20 for use with detector/amplifier circuit 16, is shown in FIG. 1 as a selector switch 21 with a separate pole connected to each of coils 20. If only one coil 20 is used, of course, no selector switch is needed. The present invention applies to one or any number of coils 20. Other selector means such as stepping relays and solid-state switches may be used without departing from the spirit and gist of the invention.

Detector/amplifier circuit 16 includes an NPN transistor 22, the base B of which is connected to first side of a capacitor 24 and a first side of a resistance means 26. The collector C of transistor 22 is connected to a first side of a resistance means 28 and to a first side of an inductance means 30. The emitter E of transistor 22 is connected to a terminal T1 of terminals 18 and a first side of a resistance means 32. Second side of resistance means 26 and 28 and a second side of inductance means 30 are connected to a terminal T2 of terminals 18. A second side of resistance means 32 is connected to a first side of inductance means 12 and to a terminal T3 of terminals 18. A second side of capacitor 24 is connected through selector means 14 to a second side of inductance means 12. Inductance means 30, in the illustrated embodiment, comprises a small coil of wire 31. Resistance means 26, 28 and 32 comprise resistors 27, 29, and variable resistor 33 respectively.

The operation of sensing means 10 is the same regardless of the shape and location of the coil used. A DC voltage is applied at terminals T2 and T3 so that T2 is positive with respect to T3. Transistor 22, in conjunction with inductance means 30, resistance means 26, 28, and 32, capacitor 24, and one of coils 20, will oscillate. One example of the frequency of oscillation is 2 megahertz. The oscillation occurs at approximately the self-resonant frequency of coil 20. Resistor 27 is one means of providing an appropriate bias to base B of transistor 22. The required phase shift for oscillation is provided by inductance means 30 and one of coils 20 in addition to transistor 22. Resistor 29 acts to lower the Q of inductance means 30. Variable resistor 33 provides a suitable impedance across which an output signal at terminals T1 and T3 is developed. Variable resistor 33 also acts to provide degeneration in the oscillator and so acts as a sensitivity adjustment. As the level of liquid 40 rises and comes into close proximity to a coil 20, the electrical conduction of the liquid changes the Q of the coil. This quenches oscillation in the coil and in detector/amplifier circuit 16 as well. Therefore, the electrical signal appearing across T1 and T3 changes. This change may be detected, amplified, and used to trigger a solid-state switching means. In another example, the change may be observed as a reading on a voltage meter.

What is claimed is:

1. A sensing means for sensing the level of a liquid comprising:
   a. a container containing said liquid;
   b. a coil of wire wound around the outside of a coil former, said coil former disposed in said container; and
   c. a detector/amplifier circuit connected to said coil of wire, said detector/amplifier circuit in combination with said coil of wire comprising an oscillator circuit to provide electrical oscillations therein, said detector/amplifier circuit including means adjusting the sensitivity of said oscillator circuit such that when a liquid is provided in close proximity to said coil of wire said oscillations are quenched, said detector/amplifier circuit providing an electrical signal to activate at least one device when said oscillations are quenched;
   d. said detector/amplifier circuit including a transistor, the base of which is connected to a first side of a capacitance means and a first side of a first resistance means, the collector of which is connected to a first side of a second resistance means and to a first side of an inductance means, and the emitter of which is connected to a first electric terminal and a first side of a third resistance means; a second side of said first and second resistance means and a second side of said inductance means connected to a second electric terminal; a second side of said third resistance means connected to a first side of said coil of wire and to a third electric terminal; and a second side of said capacitance means connected to a second side of said coil of wire.

* * * * *